(12) United States Patent
Dietrich et al.

(10) Patent No.: US 11,606,906 B2
(45) Date of Patent: Mar. 21, 2023

(54) HARVESTING INTER-SEEDED CROPS

(71) Applicant: 101288550 Saskatchewan Ltd., Assiniboia (CA)

(72) Inventors: Dave Dietrich, Assiniboia (CA); Ron Wheeler, Moose Jaw (CA)

(73) Assignee: 101288550 Saskatchewan Ltd.

( * ) Notice: Subject to any disclaimer, the term of this patent is extended or adjusted under 35 U.S.C. 154(b) by 362 days.

(21) Appl. No.: 16/887,770

(22) Filed: May 29, 2020

(65) Prior Publication Data

US 2020/0288637 A1 Sep. 17, 2020

Related U.S. Application Data

(62) Division of application No. 15/735,602, filed as application No. PCT/CA2016/000158 on Jun. 1, 2016, now Pat. No. 10,681,868.

(30) Foreign Application Priority Data

Jun. 11, 2015 (CA) ................................ CA 2894100

(51) Int. Cl.
*A01D 75/00* (2006.01)
*A01D 41/14* (2006.01)
(Continued)

(52) U.S. Cl.
CPC .............. *A01D 75/00* (2013.01); *A01B 39/26* (2013.01); *A01D 34/04* (2013.01); *A01D 34/40* (2013.01); *A01D 41/14* (2013.01)

(58) Field of Classification Search
CPC ........ A01D 75/00; A01D 34/04; A01D 34/40; A01D 41/14; A01B 39/26
See application file for complete search history.

(56) References Cited

U.S. PATENT DOCUMENTS 1,258,740 A * 3/1918 Blocki ................... A01D 65/02
56/313
2,014,569 A * 9/1935 Huddle .................. A01D 65/02
56/313
(Continued)

FOREIGN PATENT DOCUMENTS

CA 2814429 A1 * 11/2014 ............. A01D 65/00
DE 4110137 8/1992
(Continued)

OTHER PUBLICATIONS

"Extended European Search Report", EP Application No. 16806462. 4, dated Jan. 22, 2019, 8 pages.

*Primary Examiner* — Arpad F Kovacs
(74) *Attorney, Agent, or Firm* — Larkin Hoffman Daly & Lindgren, Ltd.; Craig J. Lervick

(57) ABSTRACT

A harvest header apparatus for harvesting a first crop in a field while preventing damage to a second later crop planted in the same field. A header table with a knife mounted along a lower front edge thereof has a plurality of crop shields attached to and spaced along the header table at a selected shield spacing, each crop shield extending forward from a rear portion thereof located under the knife to a forward end thereof located forward of the knife. A forward portion of each crop shield slopes upward such that crop plants contacted by the forward portion of each crop shield are pushed downward and pass under the knife without contacting the knife. The shield spacing is selected so the crop shields move along rows of second crop and push the second crop plants down and under the table such that same are not contacted by the knife.

16 Claims, 4 Drawing Sheets

(51) Int. Cl.
*A01B 39/26* (2006.01)
*A01D 34/04* (2006.01)
*A01D 34/40* (2006.01)

(56) References Cited

U.S. PATENT DOCUMENTS

| | | | | |
|---|---|---|---|---|
| 2,141,299 | A | * | 12/1938 | Hume ................... A01D 65/02 56/313 |
| 2,187,438 | A | | 1/1940 | Wilcox |
| 2,349,905 | A | | 5/1944 | Hyman |
| 2,734,332 | A | * | 2/1956 | Fisher ................... A01D 65/02 56/314 |
| 2,892,298 | A | * | 6/1959 | Chaney ................. A01D 65/02 56/314 |
| 3,018,601 | A | | 1/1962 | Griffin et al. |
| 3,662,525 | A | | 5/1972 | White |
| 4,219,992 | A | * | 9/1980 | Henry, Sr. .............. A01D 75/02 56/119 |
| 4,255,920 | A | * | 3/1981 | Janzen ................. A01D 41/147 56/130 |
| 4,266,489 | A | | 5/1981 | Parramore |
| 4,538,404 | A | * | 9/1985 | Heimark, Jr. ........ A01D 45/021 56/119 |
| 4,567,717 | A | | 2/1986 | Manton |
| 4,589,250 | A | | 5/1986 | Faul |
| 4,715,174 | A | | 12/1987 | Lloyd et al. |
| 5,444,968 | A | | 8/1995 | Barton |
| 5,806,292 | A | | 9/1998 | Luecke |
| 6,032,445 | A | * | 3/2000 | Heintzman .......... A01D 41/147 56/84 |
| 6,244,026 | B1 | | 6/2001 | Minnihan et al. |
| 6,564,536 | B1 | | 5/2003 | Hoffer |
| 6,631,585 | B1 | | 10/2003 | Williams |
| 6,745,550 | B1 | | 6/2004 | Hinds et al. |
| 7,634,869 | B1 | | 12/2009 | Williams |
| 9,027,316 | B2 | | 5/2015 | Dietrich et al. |
| 10,321,628 | B2 | | 6/2019 | Borry et al. |
| 2007/0028581 | A1 | * | 2/2007 | Dietrich ................ A01D 65/02 56/307 |
| 2007/0033913 | A1 | | 2/2007 | Kincaid |
| 2008/0196379 | A1 | * | 8/2008 | Yanko ................... A01D 65/02 56/313 |
| 2014/0237974 | A1 | * | 8/2014 | Dietrich ................ A01D 45/30 56/53 |

FOREIGN PATENT DOCUMENTS

| | | | | |
|---|---|---|---|---|
| DE | 10011499 | A1 | * 9/2001 | ........... A01D 41/141 |
| EP | 0713639 | A1 | * 5/1996 | ........... A01D 41/1278 |
| WO | WO-0106835 | A1 | * 2/2001 | ........... A01D 65/02 |
| WO | WO-2011038490 | A1 | * 4/2011 | ........... A01D 34/40 |
| WO | WO-2013020208 | A1 | * 2/2013 | ........... A01D 43/06 |

* cited by examiner

HARVESTING INTER-SEEDED CROPS

This disclosure relates to the field of agricultural implements and in particular a harvest header for a combine.

BACKGROUND

Typically, the knife assembly on harvest headers comprises a knife extending along the front lower edge of the header table, the knife comprising a plurality of triangular knife sections attached to a knife bar such that the apex of the triangle extends forward from the knife bar. The exposed side edges of the knife sections are sharpened. Guards are attached to the front lower edge of the header table and serve to protect the knife sections from breakage when contacting stones and like obstructions. The guards comprise pointed guard fingers extending forward, and the knife moves back and forth along the edge of the header table with the knife sections moving in a slot cut laterally through the guard fingers. In addition to protecting the knife, the guard fingers also enable the knife sections to cut the crop. As the knife section moves back and forth it pushes crop against the sides of those portions of the guard finger that are above and below the slot, shearing the crop stalks.

In regions where the growing season is too short to permit two separate crops one after the other, inter-seeded cropping may be practiced where the second crop is seeded into the first one before the first crop is harvested. For example, it is known to plant soybeans in the spring into an established field of winter wheat that was seeded the previous fall. The soybeans and wheat grow side by side and when the wheat is mature it is harvested, typically with a harvest header as described above. Depending on the height of the wheat and the soybeans, significant damage to the soybeans can occur. Where the wheat crop is standing healthy and tall the header can be operated quite high, such that very little of the soybeans is contacted and cut by the knife. Where the wheat crop is short or lying down a significant portion of the soybean plants may be cut off, which often reduces the eventual yield of soybeans.

SUMMARY OF THE INVENTION

The present disclosure provides a harvest header apparatus that overcomes problems in the prior art.

The present disclosure provides a harvest header that allows cutting and harvesting of the first crop of an inter-seeded field while preventing the second crop from being cut so that the second crop can mature without damage and be harvested after the first crop is harvested. In inter-seeded crops the first crop, such as winter wheat, can be planted in the fall at a fairly wide row spacing, typically for example about 20-30 inches. After that first crop has emerged and generally in the spring, a second crop such as beans, is planted in rows typically midway between the rows of the first crop. The present disclosure provides a harvest header that allows cutting and harvesting of the first crop while preventing the second crop from being cut so that the second crop can mature and be harvested after the first crop is harvested. Tram lines may be provided In a first embodiment the present disclosure provides a harvest header apparatus comprising a header table with a knife mounted along a lower front edge thereof and a plurality of crop shields attached to and spaced along the header table at a selected shield spacing, each crop shield extending forward from a rear portion thereof located under the knife to a forward end thereof located forward of the knife. A forward portion of each crop shield slopes upward such that crop plants contacted by the forward portion of each crop shield are pushed downward and pass under the knife without contacting the knife.

In a second embodiment the present disclosure provides a method of harvesting first plants of a first crop planted in a field while preventing damage to second plants of a second crop planted in the field. The method comprises planting the first plants in first rows; planting the second plants in second rows, where each second row is substantially midway between adjacent first rows; allowing the first plants to mature; providing a harvest header apparatus comprising a header table with a knife mounted along a lower front edge thereof; mounting a plurality of crop shields to the lower front edge of the header table such that the crop shields are aligned with the second rows; moving the harvest header apparatus in an operating travel direction parallel to the first and second rows with the crop shields aligned with the second rows such that second plants contacted by a forward portion of each crop shield are pushed downward and pass under the knife without contacting the knife, and cutting the first plants with portions of the knife exposed between the crop shields.

The present disclosure provides a simple and economical apparatus for preventing damage to a second crop while harvesting a first crop planted in the same field. The same row spacing is used with each crop so the same seeding implement can be used to plant both crops, and a conventional harvest header can be used for the harvesting conventional and inter-seeded crops.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
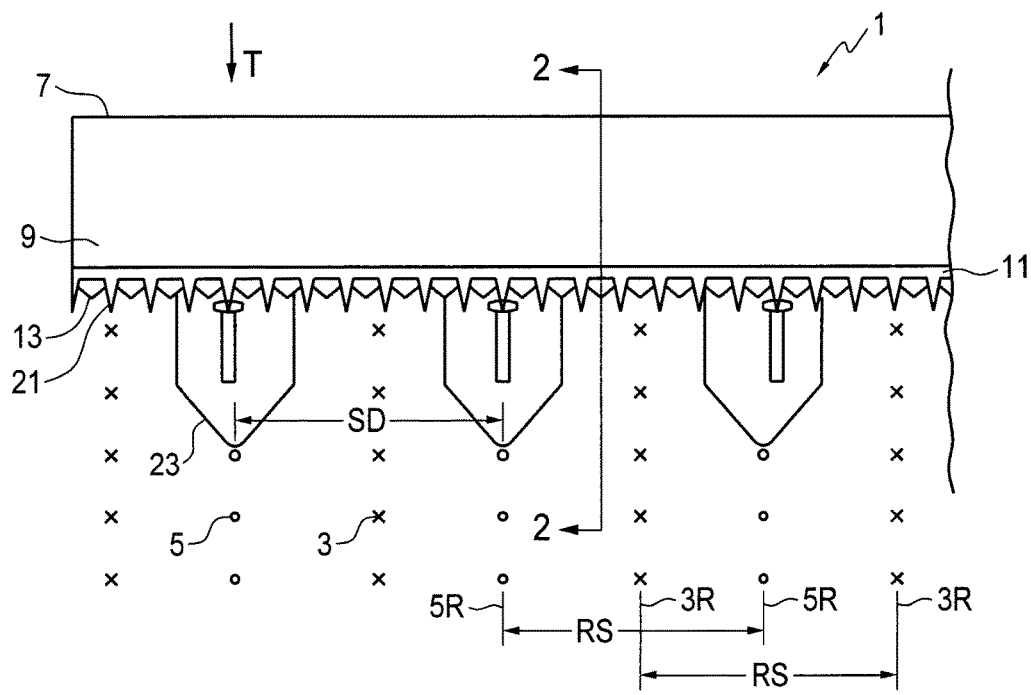
FIG. 1 is a schematic top view of a conventional harvest header with a plurality of crop shields of the present disclosure mounted thereon.

FIG. 1 schematically illustrates an embodiment of a harvest header apparatus 1 of the present disclosure travelling along a field to harvest first plants 3 of a first crop while preventing the header from cutting the second plants 5 of a second different crop which are growing in rows between rows of the first plants 3 as illustrated. Typically, the first crop of first plants 3 are planted in first rows 3R separated by a row spacing RS, and the second crop of second plants 5 are planted in second rows 5R separated by the same row spacing RS, where each second row 5R is substantially midway between adjacent first rows 3R.

Figure 2:
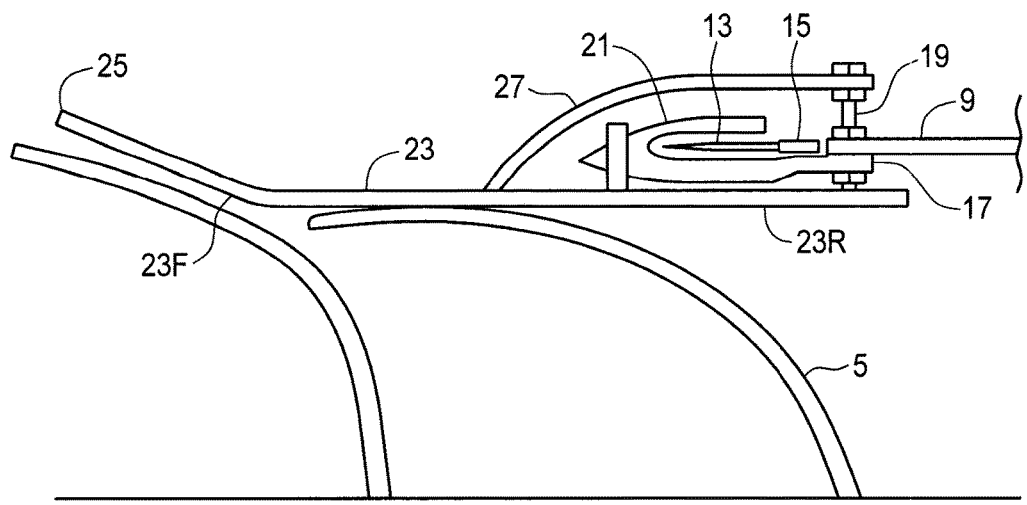
FIG. 2 is a schematic side view along line 2-2 in FIG. 1.

A typical cutting harvest header 7 comprises a header table 9 with a knife 11 mounted along the front lower edge of the header table 9. As schematically illustrated in FIGS. 1 and 2, the knife 11 comprises a plurality of triangular knife sections 13 attached to a knife bar 15 such that the apex of the triangle extends forward from the bar 15. Guards 17 are attached to the front lower edge of the header table 9 with guard bolts 19. The guards 17 comprise pointed guard fingers 21 extending forward which provide a slot through which the knife sections 13 pass to cut the crop plants, and also serve to protect the knife sections 13 from breakage when contacting stones and like obstructions.

A plurality of crop shields 23 is mounted to a harvest header 7. As seen in FIG. 2, the crop shields 23 are attached to and are spaced along the header table 9 at a selected shield spacing SD that is equal to the row spacing RS. The harvest header 7 is guided along the rows in operating travel direction T such that the center of each crop shield 23 is substantially aligned with the second rows 5R of second crop plants 5. As the header 7 moves along the field the second plants 5 of the second crop are pushed downward by the crop shields 23 and prevented from contacting the knife 11 and pass under the header table 9 without being cut as shown in FIG. 2. In order to accommodate a variety of row spacings, which typically will be 20 to 30 inches, the shield spacing SD is adjustable, and the lateral position of each crop shield 23 along the header table 9 is adjustable to accommodate the different shield spacing distances SD.

Each crop shield 23 extends forward from a rear portion thereof 23R located under the knife 11 to a forward end 25 thereof located forward of the knife 11. A forward portion 23F of each crop shield 23 slopes upward such that crop plants 5 contacted by the forward portion of each crop shield are pushed downward and under the knife.

The knife 11 is exposed in the spaces between the crop shields 23 which are aligned with the first rows 3R of first plants 3 and as the header 7 moves along the field the first plants 3 of the first crop are cut and moved onto the header table 9 and harvested conventionally.

Thus the apparatus 1 harvests the first crop plants 3 and leaves the second crop plants 5 uncut and still rooted and growing in the field. The second crop plants 5 are pushed down but otherwise not harmed. In a typical crop situation, the first crop will be a taller crop such as winter wheat which can be cut relatively high, while the second crop will be a lower growing crop such as beans, lentils, or the like.

The pointed guard fingers 21 extending forward from the lower front edge of the header table 9 provide a convenient fixed location to which the crop shields 23 can be attached. The mounting assembly 27 schematically illustrated in FIG. 2 is similar to mounting assemblies used in the prior art to attach crop lifter to guard fingers 21 and guard bolts 19.

Figure 3:
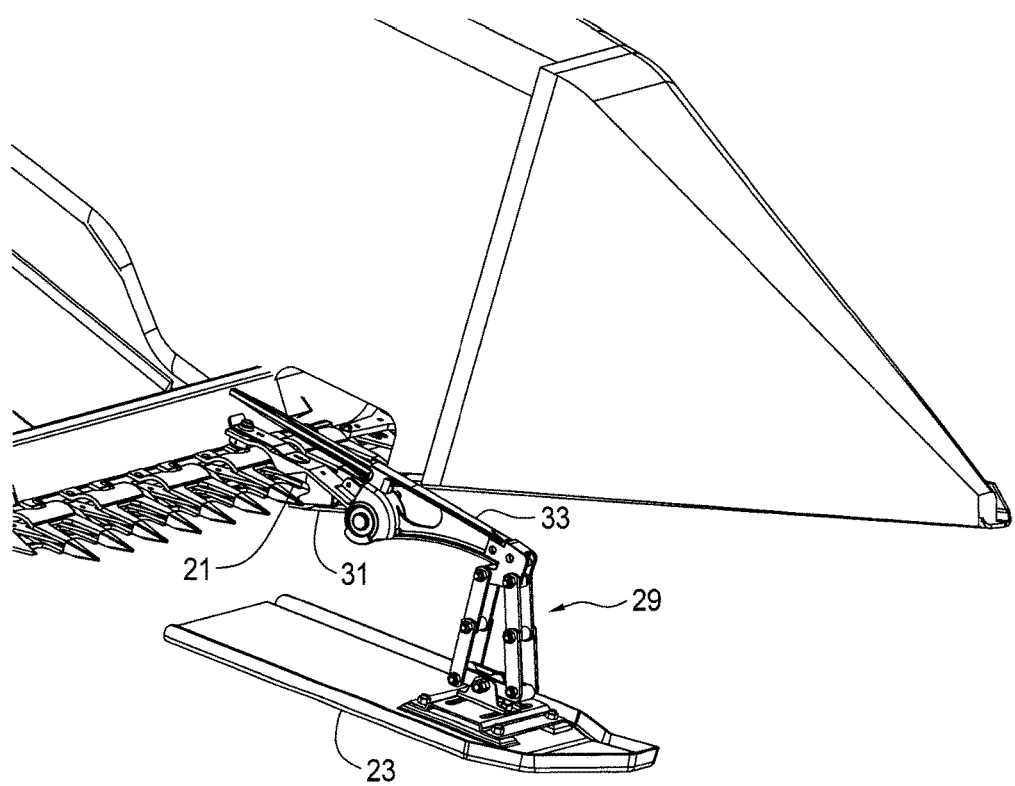
FIG. 3 is a perspective view of a crop shield mounted on the header of FIG. 1.

FIG. 3 illustrates a crop shield 23 attached to a guard finger 21 with an alternate mounting assembly 29 which provides considerable adjustment which may be desirable in many applications. Since the distance between guard fingers 21 will typically not be an even multiple of the desired shield spacing SD, spacing the crop shields 23 accurately at the desired shield spacing SD requires that the lateral position of each crop shield 23 is adjustable with respect to the guard finger 21 to which same is attached.

The mounting assembly 29 includes a quick attach finger mounting member 31 at the rear end thereof that is the same as is used in the prior art for mounting crop lifters to the guard fingers 21 and which allows the crop shields 23 to removed quickly when not required. A mounting arm 33 is mounted conventionally to the finger mounting member 31 as is known in the prior art.

Figure 4:
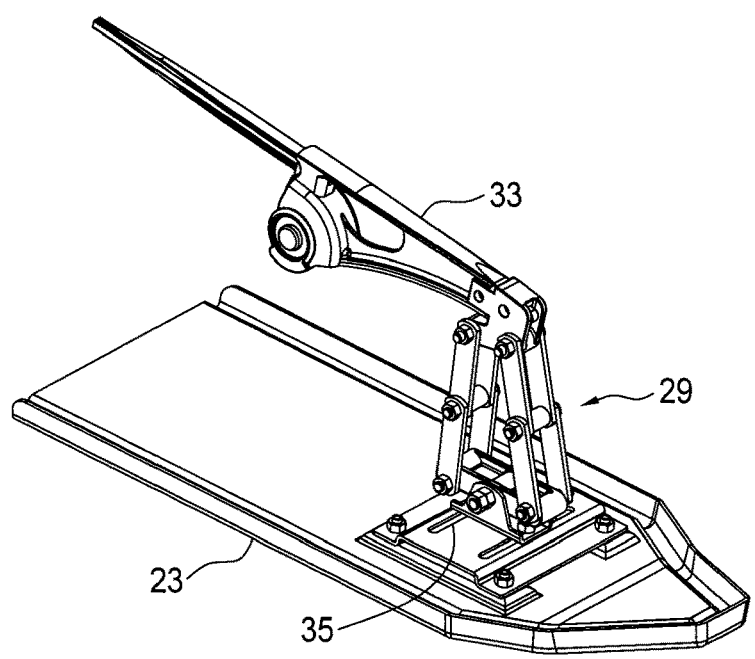
FIG. 4 is a perspective view of the mounting assembly of FIG. 3 showing lateral adjustment by moving the crop shield in slots in the mounting assembly.

The mounting assembly 29 includes, as seen in FIG. 4, slots 35 which allow for lateral adjustment of the position of the crop shield 23 with respect to the guard finger 21 to which same is attached, as schematically illustrated in FIG. 1. Further adjustment is readily achieved by loosening and tightening the bolts 37 tightening the linkage members 39 of the mounting assembly 29.

Figure 5:
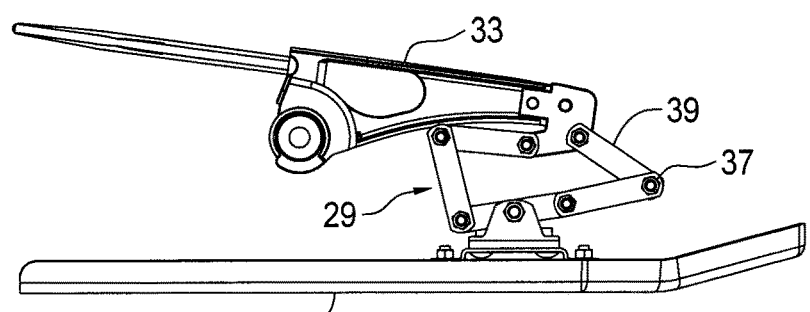
FIG. 5 is a side view of the mounting assembly of FIG. 3 showing the crop shield adjusted to a farthest rearward position.
Figure 6:
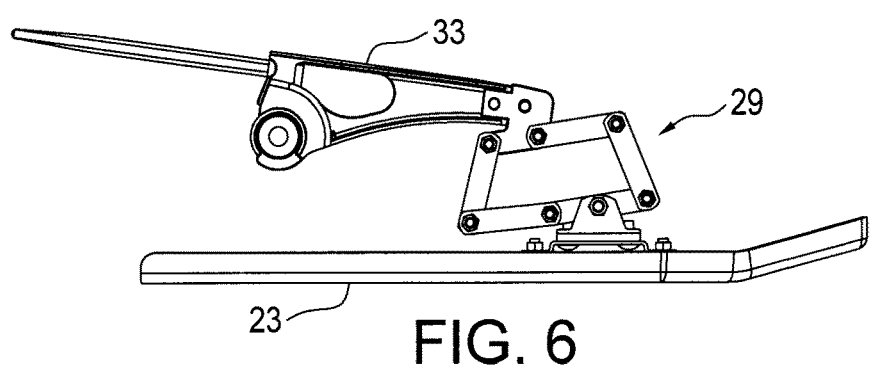
FIG. 6 is a side view of the mounting assembly of FIG. 3 showing the crop shield adjusted to a farthest forward position.
Figure 7:
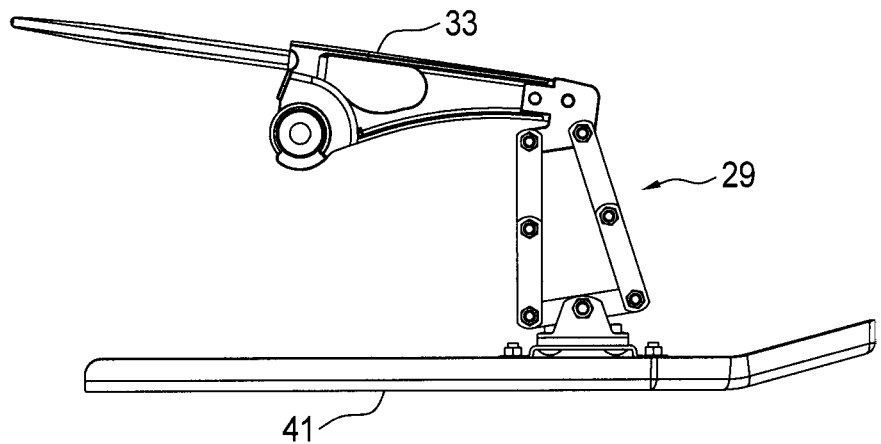
FIG. 7 is a side view of the mounting assembly of FIG. 3 showing the crop shield adjusted to a lowest position.
Figure 8:
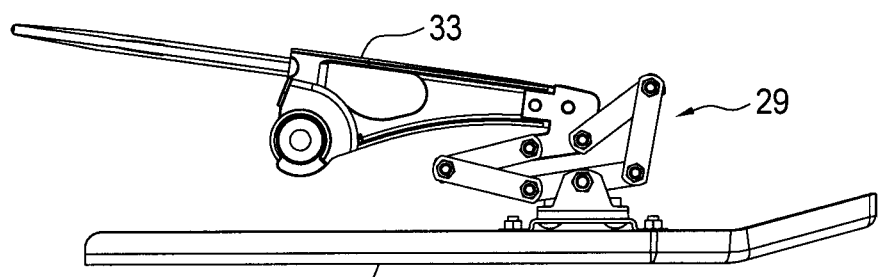
FIG. 8 is a side view of the mounting assembly of FIG. 3 showing the crop shield adjusted to a highest position.
Figure 9:
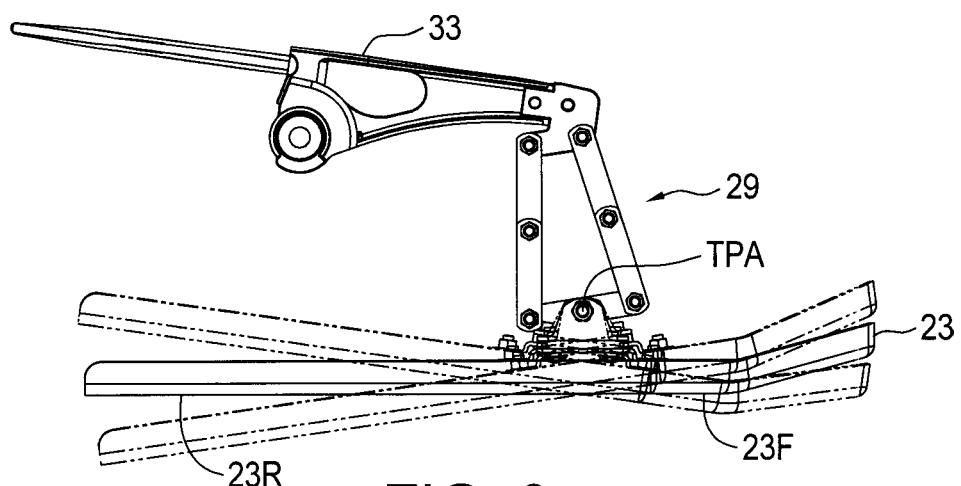
FIG. 9 is a side view of the mounting assembly of FIG. 3 showing the crop shield in a variety of tilted positions.

The mounting assembly 29 allows each crop shield 23 to be moved between a forward position shown in FIG. 5 and a rearward position shown in FIG. 6 and secured in a selected fore and aft position. Similarly, by loosening and tightening the bolts 37 the vertical position of a bottom surface 41 of each crop shield 23 can be adjusted from a lower position shown in FIG. 7 to a higher position shown in FIG. 8.

The mounting assembly 29 also provides a tilt pivot axis TPA oriented substantially horizontally and perpendicular to the operating travel direction T of the harvest header 7 about which each crop shield 23 is pivotally attached to the header table 9 such that the forward portion 23F of each crop shield 23 can be tilted up or down with respect to the rear portion 23R thereof and secured in a selected tilt position, or can be left loose to pivot about the tilt pivot axis TPA in response to crop or ground forces.

The crop shields 23 are somewhat flexible, typically made from stiff resilient plastic sheet material, and positioning is adjustable.

The present disclosure also provides a method of harvesting first plants 3 of a first crop planted in a field while preventing damage to second plants 5 of a second crop planted in the field. The method comprises planting the first plants 3 in first rows 3R; planting the second plants 5 in second rows 5R, where each second row 5R is substantially midway between adjacent first rows 3R; allowing the first plants 3 to mature; providing a harvest header 7 comprising a header table 9 with a knife 11 mounted along a lower front edge thereof; mounting a plurality of crop shields 23 to the lower front edge of the header table 9 such that the crop shields 23 are aligned with the second rows 5R; moving the harvest header 9 in the operating travel direction T parallel to the first and second rows 3R, 5R with the crop shields 23 aligned with the second rows 5R such that second plants 5 contacted by a forward portion 23F of each crop shield 23 are pushed downward and pass under the knife 11 without contacting the knife 11, and cutting the first plants 3 with portions of the knife 11 exposed between the crop shields 23. Typically, the first rows 3R will be a row spacing RS apart and the second rows 5R will be the same row spacing RS apart Following the rows accurately can be readily accomplished by seeding and then harvesting the crops using the GPS guidance systems coupled with automatic steering that are presently common in the agricultural industry. Bare tramlines could be left in the second crop where the combine travels, and crop shields 23 coinciding to these tram lines may be left on the header table 9 or removed.

The present disclosure provides a simple and economical apparatus for preventing damage to a second crop while harvesting a first crop planted in the same field. The same row spacing is used with each crop so the same seeding implement can be used to plant both crops, and a conventional harvest header can be used for the harvesting conventional and inter-seeded crops. The crop shields also will push first crop plants that are leaning over the second crop laterally and make them stand more upright making them easier to cut.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A harvest header apparatus comprising:
    a header table with a knife mounted along a lower front edge thereof;
    a plurality of crop shields attached to and spaced along the header table at a selected shield spacing, each crop shield extending forward from a rear portion thereof located under the knife to a forward end thereof located forward of the knife; and
    wherein a forward portion of each crop shield slopes upward such that crop plants contacted by the forward portion of each crop shield are pushed downward and pass under the knife without contacting the knife, and crop plants passing between the crop shields are cut by the knife and moved onto the header table; and
    and wherein a bottom surface of each crop shield extends from the rear portion of the crop shield to the forward portion of the crop shield.

2. The apparatus of claim 1 wherein the shield spacing is adjustable.

3. The apparatus of claim 2 wherein a lateral position of each crop shield is adjustable.

4. The apparatus of claim 3 wherein each crop shield is pivotally attached to the header table about a tilt pivot axis oriented substantially horizontally and perpendicular to an operating travel direction of the harvest header apparatus such that the forward portion of each crop shield can be tilted up or down with respect to the rear portion thereof.

5. The apparatus of claim 4 wherein each crop shield is movably attached to the header table such that a vertical position of a bottom surface thereof can be adjusted.

6. The apparatus of claim 5 wherein each crop shield is movable forward and rearward and is securable in a selected fore and aft position.

7. The apparatus of claim 1 comprising knife guards with pointed guard fingers extending forward from the lower front edge of the header table and wherein each crop shield is attached to at least one guard finger.

8. The apparatus of claim 1 configured for harvesting a first crop planted in first rows while preventing damage to plants of a second crop planted in second rows, where each second row is substantially midway between adjacent first rows, and wherein the shield spacing is selected such that the crop shields are aligned with the second rows.

9. The apparatus of claim 1 wherein the crop shields are made from a resilient material.

10. The apparatus of claim 3 comprising knife guards with pointed guard fingers extending forward from the lower front edge of the header table and wherein each crop shield is attached to at least one guard finger.

11. The apparatus of claim 5 comprising knife guards with pointed guard fingers extending forward from the lower front edge of the header table and wherein each crop shield is attached to at least one guard finger.

12. The apparatus of claim 6 comprising knife guards with pointed guard fingers extending forward from the lower front edge of the header table and wherein each crop shield is attached to at least one guard finger.

13. The apparatus of claim 2 configured for harvesting a first crop planted in first rows while preventing damage to plants of a second crop planted in second rows, where each second row is substantially midway between adjacent first rows, and wherein the shield spacing is selected such that the crop shields are aligned with the second rows.

14. The apparatus of claim 12 configured for harvesting a first crop planted in first rows while preventing damage to plants of a second crop planted in second rows, where each second row is substantially midway between adjacent first rows, and wherein the shield spacing is selected such that the crop shields are aligned with the second rows.

15. The apparatus of claim 8 wherein the crop shields are made from a resilient material.

16. The apparatus of claim 14 wherein the crop shields are made from a resilient material.

* * * * *

UNITED STATES PATENT AND TRADEMARK OFFICE
CERTIFICATE OF CORRECTION

PATENT NO. : 11,606,906 B2
APPLICATION NO. : 16/887770
DATED : March 21, 2023
INVENTOR(S) : Dave Dietrich and Ron Wheeler It is certified that error appears in the above-identified patent and that said Letters Patent is hereby corrected as shown below:

On the Title Page

Column 1, (73) Assignee after the word "Ltd.", insert --Assiniboia (SK)--.

In the Claims

In Claim 1 at Column 5, Line 32, before the word "wherein", delete the word "and".

Signed and Sealed this
Second Day of May, 2023

Katherine Kelly Vidal
*Director of the United States Patent and Trademark Office*